UNITED STATES PATENT OFFICE.

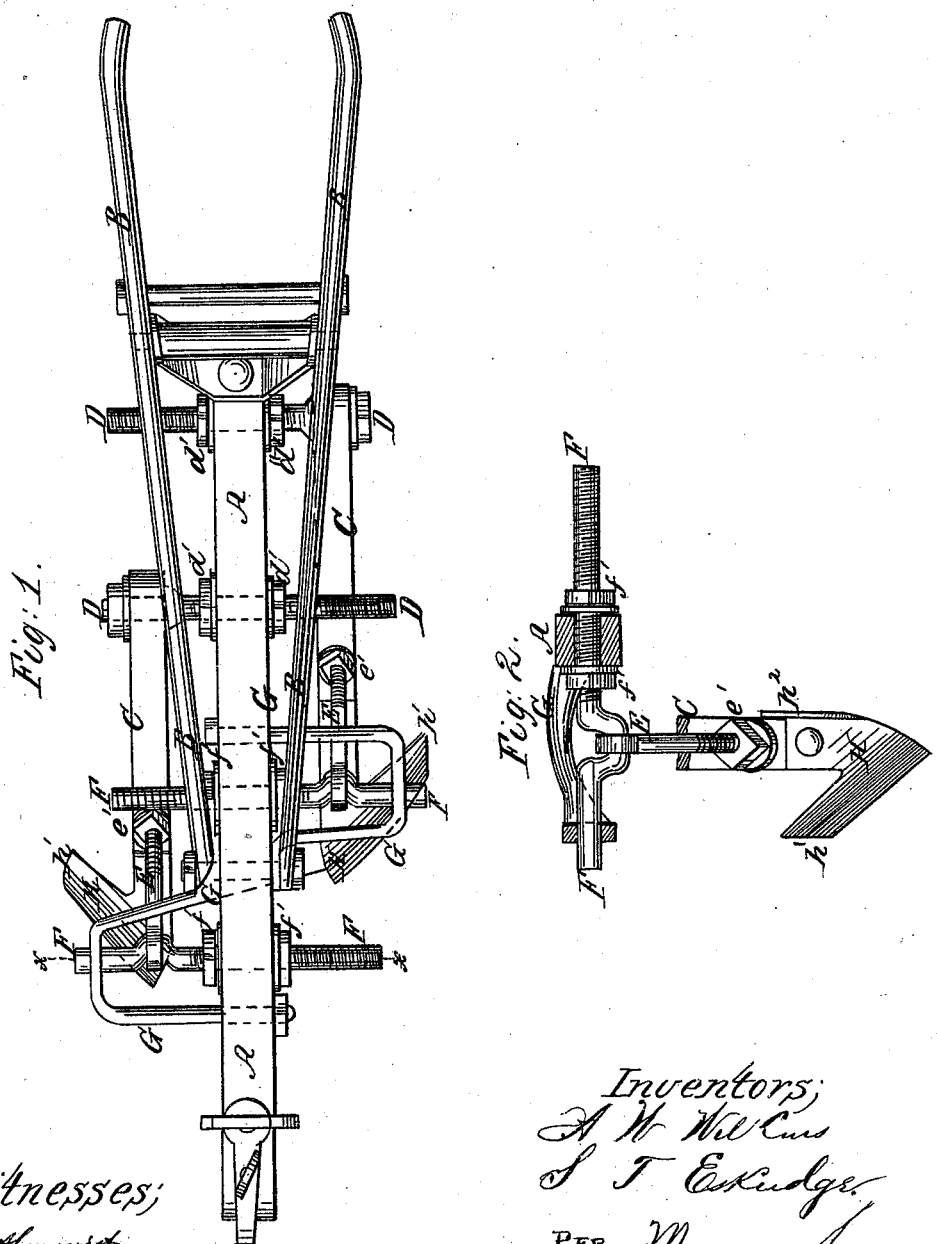

A. W. WILKINS AND S. T. ESKRIDGE, OF ROME, GEORGIA.

IMPROVEMENT IN EXPANDING PLOWS.

Specification forming part of Letters Patent No. 97,465, dated November 30, 1869.

*To all whom it may concern:*

Be it known that we, A. W. WILKINS and S. T. ESKRIDGE, of Rome, in the county of Floyd and State of Georgia, have invented a new and useful Improvement in Expanding Plows; and we do hereby declare that the following is a full, clear, and exact description thereof, which will enable others skilled in the art to make and use the same, reference being had to the accompanying drawings, forming part of this specification, in which—

Figure 1 is a top or plan view of our improved plow. Fig. 2 is a detail sectional view of the same taken through the line $x\ x$, Fig. 1.

Our invention has for its object to improve the construction of expanding plows in such a way that the standards may be moved toward and from each other squarely, and in such a way that the pitch of the plows may be adjusted as required; and it consists in the construction and combination of various parts of the machine as hereinafter more fully described.

A is the plow-beam, to the forward end of which is attached a clevis in the ordinary manner.

B are the handles, which are attached to the beam A in the ordinary manner.

C are the plow-standards, the upper ends of which are secured to the outer ends of the rods or bolts D by means of a washer and nut. The rods or bolts D pass through the beam A, and have screw-threads formed upon them to receive the washers and nuts $d'$, which are placed upon the said rods or bolts, one upon each side of the beam A, so that the upper ends of the standards may be moved out or in to expand or contract the plow by simply adjusting the position of the nuts $d'$. The draft-strain upon the standards C is sustained by the brace-rods E, the lower or rear ends of which pass through the lower part of the said standards C, and have screw-threads cut upon them to receive the nuts $e'$, which are placed one upon each side of said standards, so that by simply adjusting the position of the said nuts $e'$ the pitch of the standards C, and consequently the depth to which the plows enter the ground, may be adjusted at will. The forward ends of the rods E have holes or eyes formed in them to receive the bolts or rods F, in a bend of which they rest, as shown in Figs. 1 and 2. The inner ends of the rods or bolts F pass through the beam A, and have screw-threads formed upon them to receive the nuts $f'$, which are placed upon each side of the beam A, so that by simply adjusting the position of the nuts $f'$ the lower ends of the standards C may be adjusted to correspond with the adjustment of the upper ends of said standards. The outer ends of the rods or bolts F enter and slide longitudinally in a hole in the brackets G, by which brackets the outer ends of said rods or bolts are supported against the draft-strain. The brackets G are securely bolted to the sides of the beam A, as shown in Fig. 1.

H are the plows, which are detachably attached to the lower ends of the standards C, and which are made with a wing or scraper $h'$ upon their outer sides, and their inner sides are bent forward, as shown in Fig. 2, to form cutters or guards $h^2$, to prevent the young plants from being injured by clods, &c., raised by the plows.

If desired, scrapers, shovels, bull-tongues, or any other suitable plows may be attached to the standards C, as the circumstances of each case may render most suitable.

Having thus described our invention, we claim as new and desire to secure by Letters Patent—

1. Adjustably supporting the lower ends of the plow-standards C by means of the brace-rods E, nuts $e'$, rods or bolts F, nuts $f'$, and brackets G, said parts being constructed, arranged, and operating, substantially as herein shown and described, and for the purposes set forth.

2. The combination of the rods and nuts D $d'$, rods and nuts E $e'$, rods and nuts F $f'$, and brackets G with each other and with the beam A and standards C of the plow, substantially as herein shown and described, and for the purpose set forth.

A. W. WILKINS.
S. T. ESKRIDGE.

Witnesses:
B. A. WATTERS,
C. W. RUSH.